(12) United States Patent
Lansing et al.

(10) Patent No.: US 11,374,990 B2
(45) Date of Patent: Jun. 28, 2022

(54) SAVING AN OVERLAY ANNOTATION IN ASSOCIATION WITH A SHARED DOCUMENT

(71) Applicant: Box, Inc., Redwood City, CA (US)

(72) Inventors: Derrik Randal Lansing, North Ogden, UT (US); Michelle Sangeun Oh, San Francisco, CA (US)

(73) Assignee: Box, Inc.

( * ) Notice: Subject to any disclaimer, the term of this patent is extended or adjusted under 35 U.S.C. 154(b) by 0 days.

(21) Appl. No.: 17/163,259

(22) Filed: Jan. 29, 2021

(65) Prior Publication Data

US 2022/0086200 A1 Mar. 17, 2022

Related U.S. Application Data

(60) Provisional application No. 62/706,865, filed on Sep. 14, 2020.

(51) Int. Cl.
| | |
|---|---|
| *G06F 8/60* | (2018.01) |
| *G06F 40/106* | (2020.01) |
| *G06F 3/04845* | (2022.01) |
| *G06F 40/169* | (2020.01) |
| *H04L 65/403* | (2022.01) |
| *H04L 65/401* | (2022.01) |

(Continued)

(52) U.S. Cl.
CPC ........ *H04L 65/403* (2013.01); *G06F 16/9577* (2019.01); *H04L 65/4015* (2013.01); *G06F 8/60* (2013.01)

(58) Field of Classification Search
USPC ........ 709/204, 217, 206, 236; 715/236, 277, 715/230
See application file for complete search history.

(56) References Cited

U.S. PATENT DOCUMENTS

| | | | |
|---|---|---|---|
| 6,329,984 B1 * | 12/2001 | Boss | G06F 3/0481 |
| | | | 715/204 |
| 9,426,416 B2 | 8/2016 | Eikenes et al. | |
| 9,961,302 B1 * | 5/2018 | Henderson | H04N 7/152 |

(Continued)

FOREIGN PATENT DOCUMENTS

| | | |
|---|---|---|
| EP | 3342158 A4 | 4/2019 |
| WO | WO2019056001 A1 | 3/2019 |

*Primary Examiner* — Jude Jean Gilles
(74) *Attorney, Agent, or Firm* — Vista IP Law Group, LLP

(57) ABSTRACT

Methods, systems, and computer program products for integrating content management systems with web conferencing facilities. An overlay annotation generated via a web conferencing facility is associated with a content object of a content management system. Integration code at the web conferencing facility displays a portion of the content object of the content management system. As user generates an overlay annotation during the web conferencing session while the content object is displayed in an interaction window of the web conferencing facility. After the overlay annotation has been captured, the content management system receives the overlay annotation from the web conferencing facility and stores the overlay annotation in an annotation content object separate from the content object of the content management system. Registrations and other associations between the overlay annotation object and the content object itself are stored for either or both of the overlay annotation object and the content object.

20 Claims, 9 Drawing Sheets

(51) Int. Cl.
*G06F 16/957* (2019.01)
*H04N 7/15* (2006.01)

(56) References Cited

U.S. PATENT DOCUMENTS

| | | | | |
|---|---|---|---|---|
| 2004/0049345 A1* | 3/2004 | McDonough | G06Q 10/10 | 702/12 |
| 2013/0088563 A1* | 4/2013 | Wu | H04N 7/15 | 348/14.07 |
| 2013/0311177 A1* | 11/2013 | Bastide | H04N 7/15 | 704/235 |
| 2014/0006919 A1* | 1/2014 | He | G06F 40/169 | 715/230 |
| 2014/0028707 A1* | 1/2014 | Kapoor | G06F 3/1454 | 345/629 |
| 2014/0033133 A1* | 1/2014 | Pegg | G06F 3/04812 | 715/863 |
| 2015/0026062 A1* | 1/2015 | Paulsen | G06Q 20/29 | 705/44 |
| 2015/0134600 A1* | 5/2015 | Eisner | G06F 16/13 | 707/608 |
| 2015/0172335 A1* | 6/2015 | Sitrick | G06F 40/106 | 715/719 |
| 2015/0199321 A1* | 7/2015 | Mattingly | G06F 40/169 | 715/231 |
| 2015/0248387 A1* | 9/2015 | Mattingly | G06Q 50/184 | 715/230 |
| 2016/0092442 A1* | 3/2016 | Gillett | G06F 21/6218 | 707/608 |
| 2017/0277669 A1* | 9/2017 | Sekharan | G06F 40/169 | |
| 2017/0277696 A1* | 9/2017 | Sekharan | H04L 65/403 | |
| 2018/0352194 A1 | 12/2018 | Segal et al. | | |
| 2019/0019022 A1* | 1/2019 | Marda | G06V 30/418 | |
| 2019/0073827 A1* | 3/2019 | Coronado | H04Q 9/00 | |
| 2019/0166400 A1* | 5/2019 | Andreou | H04N 21/2396 | |
| 2019/0379712 A1* | 12/2019 | Mota | H04L 65/403 | |
| 2019/0394425 A1 | 12/2019 | Segal | | |

* cited by examiner

SAVING AN OVERLAY ANNOTATION IN ASSOCIATION WITH A SHARED DOCUMENT

RELATED APPLICATIONS

The present application claims the benefit of priority to U.S. Provisional Patent Application Ser. No. 62/706,865 titled "MULTI-PARTY INTEGRATIONS" filed on Sep. 14, 2020, which is hereby incorporated by reference in its entirety.

TECHNICAL FIELD

This disclosure relates to content management systems, and more particularly to techniques for saving a shared annotation in association with a shared document.

BACKGROUND

Web conferencing has been a boon to collaboration. With web conferencing, where users of the web conferencing system can display documents of their choosing, collaboration activities are enhanced. Users can simultaneously see the same document at the same time and can voice their comments for consideration to all participants of the web conference.

Some web conferencing systems support user annotations. With user annotations, one or more participants of a particular web conference can use a computer mouse or pen or other pointing device to draw, highlight, add shapes, etc. over whatever image is being displayed in the web conferencing window. In some cases, a web conference user will choose to annotate over a "clean slate", where a blank area is provided in the web conferencing window and where the user can draw, highlight, add shapes, etc. over images in that window. In some cases, a web conference user will choose to draw, highlight, add shapes, etc. over a displayed document. For example, while a spreadsheet is being displayed in the web conferencing window, a web conference user can choose to draw, highlight, add shapes, etc. over the image of the spreadsheet.

When the conference ends, a video file (e.g., an MP4 file), an audio file (e.g., an MP3 file), any chat activity that might have occurred during the web conference, and other assets of the web conference are saved (e.g., on a computer file on the host's computer).

Unfortunately, the association between the annotation and the document over which the annotations were made is lost and the only way to recollect the association between the annotation and the document is to replay the video. What is needed are ways to address these deficiencies.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for saving a shared annotation in association with a shared document, which techniques advance the relevant technologies to address technological issues with legacy approaches. More specifically, the present disclosure describes techniques used in systems, methods, and in computer program products for saving a shared annotation in association with a shared document. Certain embodiments are directed to technological solutions for saving shared annotations with or in association with metadata pertaining to a shared document over which the annotations were made.

The disclosed embodiments modify and improve over legacy approaches. In particular, the herein-disclosed techniques provide technical solutions that address the technical problems attendant to association of annotations to documents are lost in web conferencing settings. Such technical solutions involve specific implementations (i.e., data organization, data communication paths, module-to-module interrelationships, etc.) that relate to the software arts for improving computer functionality.

The techniques for saving shared annotations with or in association with a shared document over which the annotations were made overcome long standing yet heretofore unsolved technological problems associated with the fact that association of annotations to shared documents are either non-existent or lost in web conferencing settings.

Many of the herein-disclosed embodiments for saving shared annotations with or in association with a shared document over which the annotations were made are technological solutions pertaining to technological problems that arise in the hardware and software arts that underlie multi-party collaboration systems. Aspects of the present disclosure achieve performance and other improvements in peripheral technical fields including, but not limited to, human-machine interfaces and collaboration system interfacing.

Some embodiments include a sequence of instructions that are stored on a non-transitory computer readable medium. Such a sequence of instructions, when stored in memory and executed by one or more processors, cause the one or more processors to perform a set of acts for saving shared annotations with or in association with a shared document over which the annotations were made.

Some embodiments include the aforementioned sequence of instructions that are stored in a memory, which memory is interfaced to one or more processors such that the one or more processors can execute the sequence of instructions to cause the one or more processors to implement acts for saving shared annotations with or in association with a shared document over which the annotations were made.

In various embodiments, any combinations of any of the above can be combined to perform any variations of acts for saving a shared annotation in association with a shared document, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
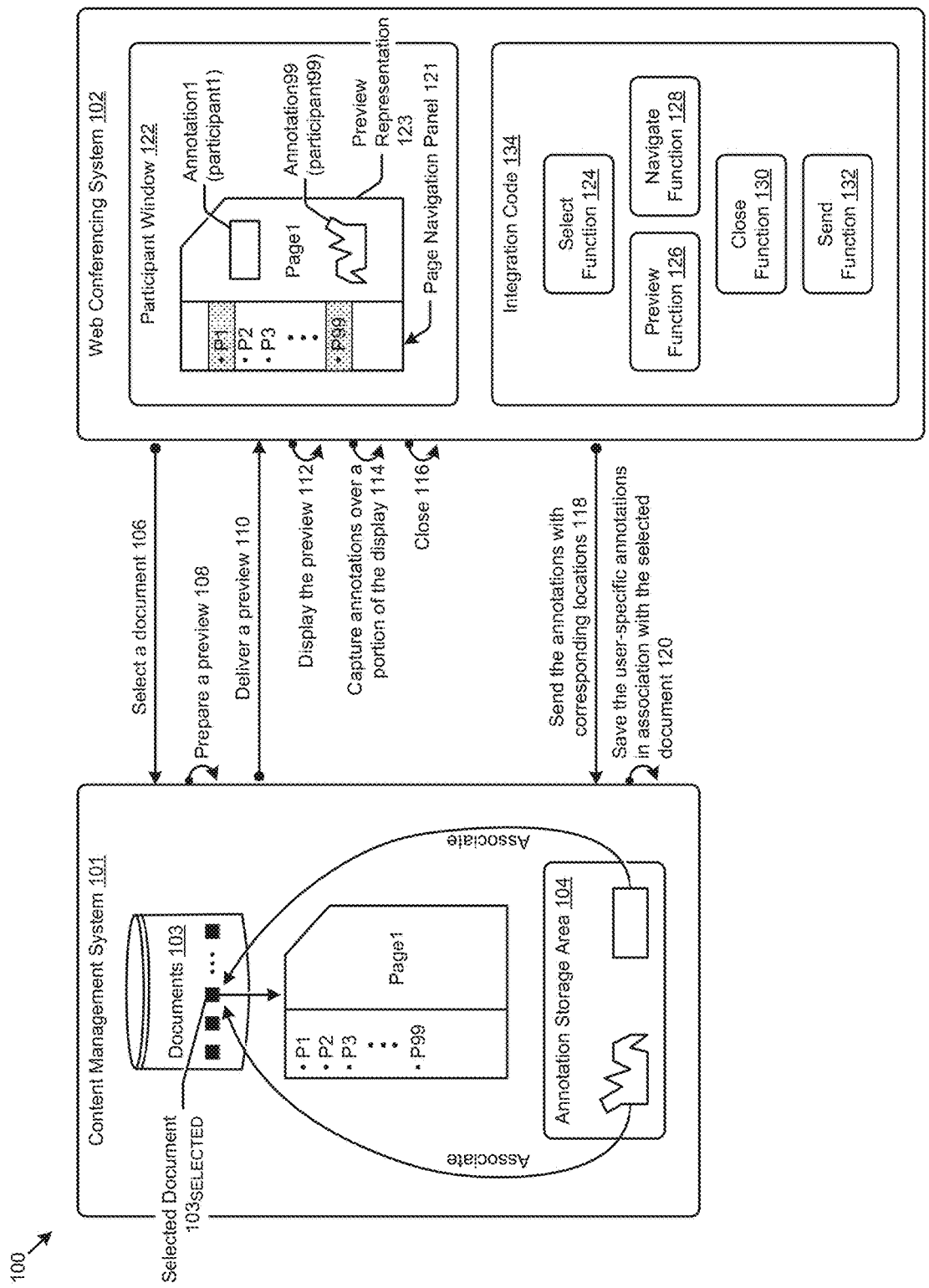
FIG. 1 exemplifies an environment in which embodiments of the present disclosure can operate.

Aspects of the present disclosure solve problems related to associating annotations with corresponding documents that are shared in web conferencing settings. These problems are unique to, and may have been created by, various computer-implemented methods used in web conferencing settings. Some embodiments are directed to approaches for saving shared annotations with or in association with a shared document over which the annotations were made.

Overview

During a web conferencing session, a user may choose to share their screen or may choose to share images that derive from files available to the user. For example, a first user might share images of a spreadsheet as it is rendered in a spreadsheet application (e.g., in Microsoft Excel) that is running on the first user's computer. The first user can discuss the spreadsheet, possibly moving the mouse cursor or other pointing cursor over regions of the spreadsheet while providing a voiceover for all web conference participants to see and hear.

Some web conferencing facilities provide a set of annotation tools (e.g., line drawing tools, curve drawing tools, text box tools, erasers, etc.) for users of the web conferencing facility to annotate over whatever is being displayed on the web conference display area. Some web conferencing facilities provide a mechanism for multiple participants of the web conference to annotate individually, possibly using different display layers (e.g., sprites) for each individual's annotations. In this manner, each individual participant can make user-specific annotations, and can freely use the annotation tools, including erasers to make and change annotations over whatever is being displayed on the web conference display area.

In many situations, a user will display a particular document for collaboration (e.g., discussion and annotation) with the participants of the web conference. In such cases, and in accordance with the embodiments disclosed herein, the annotations are associated with the displayed document. Moreover, and in accordance with the embodiments disclosed herein, particular annotations are associated with the particular participant that made the particular annotations over the displayed document.

In some embodiments, the particular document that is displayed for collaboration is drawn from documents of a content management system. As such, the particular annotations (e.g., user-specific annotations) made by any particular participants are stored at the content management system in association with the displayed document, which document is also stored at the content management system. A user of the content management system can access the document stored at the content management system and thereafter access the annotations. Some embodiments provide for associating annotations with a particular user of the content management system, and some embodiments provide for associating annotations with a particular conferencing user that is not a content management system user. Further, some embodiments provide for associating annotations with an anonymous user. This latter case can happen when there is no screen name or email alias or other moniker that uniquely identifies a user. In this latter case, an auto-generated user identifier is assigned to the anonymous user. Annotations that are raised by such an anonymous user are associated with the auto-generated user identifier. For example, an annotation can have corresponding metadata that indicates when and by whom a particular annotation was drawn. Such metadata can be human readable such as "Annotation99 was saved on Jan. 20, 2020 at 11:50 am by 'AnonUser123'".

Some embodiments provide for associating annotations with a particular page of a page-oriented document (e.g., a Microsoft Word document). For example, if a user made an annotation onto a view (e.g., a zoom-in or partial page view) of page 1 of "Document.docx", then the annotation would be saved in association with page 1 of "Document.docx". Moreover, a view region (e.g., pixel origin location, pixel height, pixel width, resolution, etc.) of the view of page 1, together with the overlay annotation (e.g., the sprite pixel origin location, pixel height, pixel width, resolution, etc.) would be saved as metadata associated with page 1 of "Document.docx".

In some embodiments, the particular document that is displayed for collaboration is drawn from documents that have organizations beyond merely page organizations. For example, a spreadsheet document might be composed of multiple sheets, any of which sheets might themselves be organized into one or more pages. In this case, if a user made an annotation onto a view (e.g., a zoom-in or partial page view) of sheet 1 of "Spreadsheet.xlsx", then the annotation would be saved in association with sheet 1 of "Spreadsheet.xlsx". Moreover, a view region (e.g., pixel origin location, pixel height, pixel width, resolution, etc.) of the view of sheet 1, together with the corresponding overlay annotation (e.g., the sprite pixel origin location, pixel height, pixel width, resolution, etc.) would be saved as metadata associated with sheet 1 of "Spreadsheet.xlsx".

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 exemplifies an environment in which embodiments of the present disclosure can operate. As an option, one or more variations of environment 100 or any aspect thereof may be implemented in the context of the architecture and functionality of the embodiments described herein.

FIG. 1 is being presented to illustrate how a content management system 101 and a web conferencing system 102 can be configured to cooperate so as to share a document of the content management system in a manner that supports capture of annotations over the shared document. This particular embodiment illustrates how a selected document $103_{SELECTED}$ can be prepared for sharing in a participant window 122 of the web conferencing system. This particular embodiment further illustrates how annotations that are made over the shared document are stored in the content management system in association with the selected document.

As shown, a user of the web conferencing system 102 interacts with screen widgets of integration code 134. Specifically, a user of the web conferencing system can interact with the screen widgets to invoke navigate function 128. The navigate function might invoke a messaging protocol and/or might invoke APIs that facilitates navigation through documents 103 of the content management system 101. Once a user (e.g., a user that is common as between the content management system and the web conferencing system) has navigated to a document to be shared (e.g., selected document $103_{SELECTED}$), that document can be selected by interacting with screen widgets pertaining the select function 124.

Responsive to the foregoing navigation and selection activities, the content management system receives an indication of the selected document (action 106). The content management system then prepares the selected document for sharing in the context of the web conferencing system. In this particular example, the content management system prepares a preview representation (operation 108), which is then delivered to the web conferencing system (via action 110). The preview representation can be comprehended by any operational element of the web conferencing system; however, in this embodiment, the preview representation is received by a preview function 126 of the integration code. The preview function may include any sorts of tools for display and navigation through the preview representation. Furthermore, the preview function may include any sort of functionality to automatically bring-up a particular page (e.g., in a particular view window, resolution, color palette, etc.), and/or to automatically bring-up a particular version of a shared document. In some situations, commands to the previewer and/or events that derive from commands to a first instance of the previewer (e.g., from the web conference host's instance) can be sent to a second and Nth instances of the previewer (e.g., to any/all of the previewer instances of the non-host web conference participants).

Further details regarding general approaches to forming and communicating presentation events are described in U.S. Pat. No. 10,742,434, issued on Aug. 11, 2020, which is hereby incorporated by reference in its entirety.

Once the preview representation is received into the web conferencing system, a user of the web conferencing system (e.g., a host or co-host) can choose to display the preview representation within his or her participant window 122. This action in turn serves to share (e.g., by sharing the display) the preview representation to the other participants. This is shown by the preview representation 123 within participant window 122. The preview representation can be manipulated by operation of preview function 126. Strictly as an example, the preview representation can be manipulated using a page navigation panel (e.g., page navigation panel 121). Display different pages (e.g., page P1, page P2, page P3, . . . , page P99) or views (e.g., rotated view, zoomed-in view, zoomed-out view) of the preview representation can be manipulated by operation of the page navigation panel. This is shown by operation 112 that displays the preview in the participant's window. The preview function of the integration code keeps track of the selected page and/or view. When a user-selected page is navigated to and selected from within the page navigation panel, the particulars of the page (e.g., page number) and particulars of the then-current view are noted. Once a page or view of a page is available, a web conferencing system user can annotate over the page or view, and the annotations can be captured (operation 114). In the example shown, (1) a first participant (e.g., participant1) draws an annotation (e.g., annotation1) over the page or view, and (2) another participant (e.g., participant99) draws an annotation (e.g., annotation99) over the same page or view.

At some point in the collaboration, the participants may choose to close the previewing activity (operation 116). This can happen automatically, for example at the end of a web conferencing session, or this can happen in response to operation of close function 130. Once a previewing activity has been closed, any assets of the annotations—including annotation metadata that describes a user/author of the annotation, an indication of the location of the annotation with respect to the previewed document (e.g., with respect to the particular page and/or particular view), an indication of the time range during which the annotation was authored, and other metadata—can be collected and sent (e.g., by operation of the send function 132 within integration code 134). The assets of the annotations are sent (message 118) and received at the content management system and are then saved in association with the selected document $103_{SELECTED}$ (operation 120). As shown, the annotation is saved within documents 103; however, in other embodiments, the annotations can be saved and merely associated with the selected document $103_{SELECTED}$. Strictly as one example of associating the annotations with the selected document, a file and/or metadata that holds or refers to a particular annotation can be stored in the same folder as the selected document. As another example of associating the annotations with the selected document, a file identity and/or corresponding path information that refers to a particular annotation can be stored in the metadata that pertains to the selected document. In some content management systems, many versions (e.g., time-stamped past and current versions) of a file can be stored. In such a situation, the information that refers to a particular annotation can be stored in the metadata pertaining to the particular version or versions that were previewed in the web conferencing setting.

In some situations, the particular version or versions that were previewed in the web conferencing setting, together with associated annotations, can be stored in a location that is made accessible to the participants in the web conference. Storage of such version or versions that were previewed in the web conferencing setting, together with associated annotations, can be stored for access by participants in the web conference who are not also users of the content management system. In this and other cases, an email can be sent to the participants in the web conference with a link that indicates where the particular version(s) and annotation(s) are persistently stored. A third-party storage service can be used for storing the version or versions that were previewed in the web conferencing setting, together with associated annotations. Additionally or alternatively, a physically sequestered or a logically sequestered annotation storage area 104 of the content management system can be used to store the version or versions that were previewed in the web conferencing setting, together with associated annotations. Computer-executable code and/or scripts that comprise a previewer module can be stored for download and use by any user on any user device.

Figure 2:
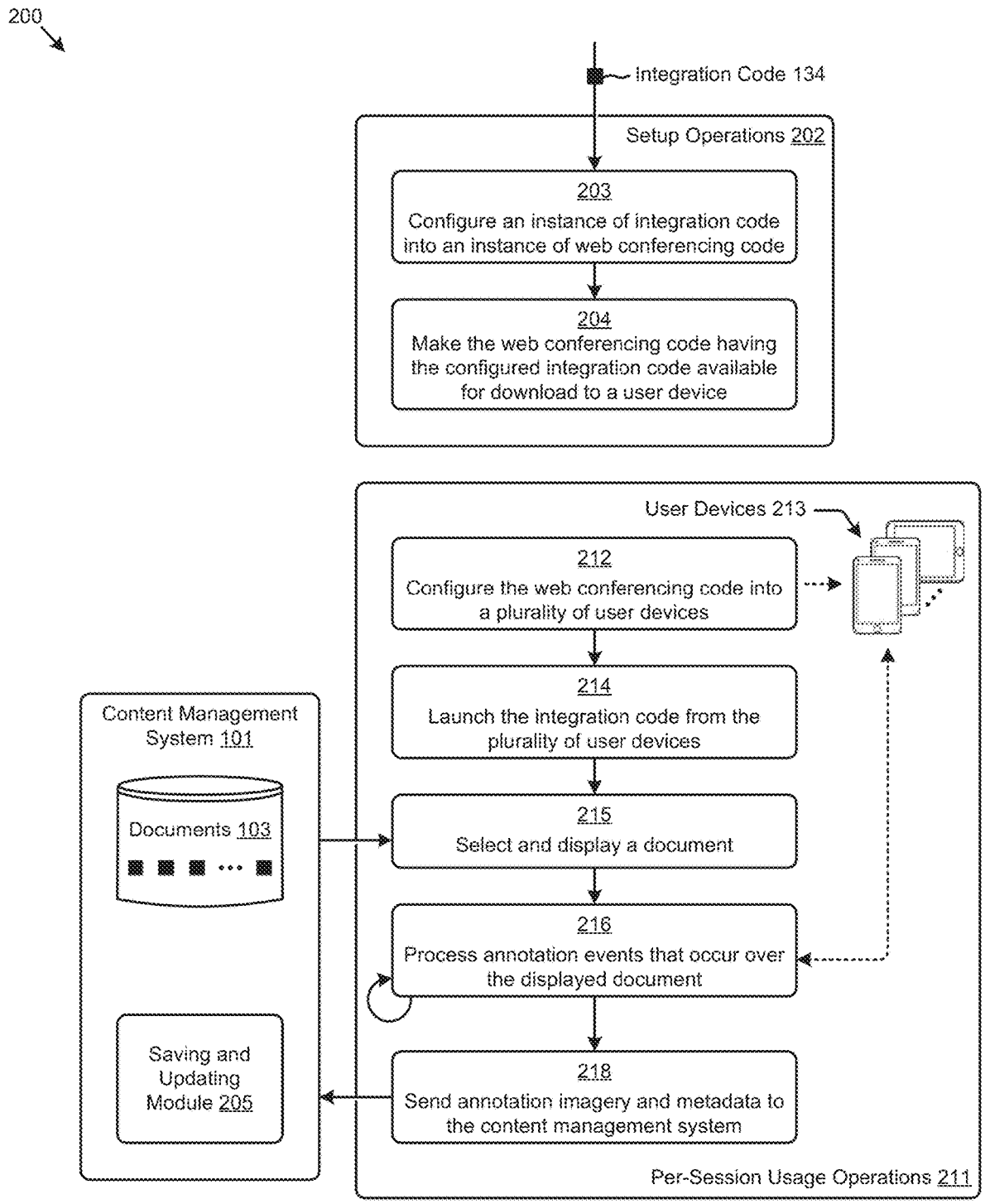
FIG. 2 shows an operational flow to illustrate how a content management system can be interfaced with a web conferencing facility, according to an embodiment.

FIG. 2 shows an operational flow 200 to illustrate how a content management system can be interfaced with a web conferencing facility. As an option, one or more variations of operational flow 200 or any aspect thereof may be implemented in the context of the architecture and functionality of the embodiments described herein and/or in any environment.

The figure is being presented to show (1) an example technique for establishing integration code into a web conferencing facility, and (2) an example technique for using the integration code over many instances on many user devices.

This example embodiment includes setup operations 202 and per-session usage operations 211. The setup operations can be performed cooperatively between the content management system and the web conferencing facility. The shown setup operations commence when integration code 134 is made available to the setup operations 202. At step 203, the integration code is configured into or in conjunction with an instance of web conferencing code then, at step 204, the web conferencing code is made available to any/all web conference users. The integration code can be any type of computer-executable code that is loaded into or onto any sort of computer-readable medium. In some cases, the aforementioned integration code is configured and made ready for usage by implementation of API calls and/or web hooks. In some cases, the aforementioned integration code is configured and made ready for usage as a result of provision of one or more scripts (e.g., JavaScript, Python, etc.) that are called by operational elements of the web conferencing facility. In some cases, the aforementioned integration code is configured and made ready for usage as additional code provided in the web conference application.

Once the setup operations have completed, web conferences can commence. More specifically, the per-session usage operations 211 can commence, so as to begin a web conference that supports user annotations over content objects of the content management system 101. At step 212, web conferencing code is provided to user devices 213. Such user devices can be laptops, desktop computers, deskside computers, pad computers, smart phones, or any other type of computing device. The aforementioned web conferencing code is provided to particular types of computing devices in a format that is readable and executable by the computing devices. In some cases, the web conferencing code, possibly together with integration code, is modified to comport with the operating system and/or other aspects of respective computing devices.

Once two or more of the user devices have installed or otherwise configured the web conferencing code, a web conference can be initiated. This can happen when two or more of the user devices launch the web conferencing code. More specifically, once two or more of the user devices have installed or otherwise configured in the web conferencing code that is interfaced with the integration code, a web conference that supports user annotations over content management object can be initiated (step 214). At step 215, user can select and display a document (e.g., selected from documents 103), after which step 216 serves to process annotation events that occur over the displayed document. Step 216 can operate continuously so as to capture any/all annotations throughout the entire time that the display of the selected document is being shared with other web conference participants. When sharing of the display of the selected document ceases (e.g., possibly by operation of a close or other command), then step 218 is entered to send annotation imagery and annotation metadata to a saving and updating module 205 of the content management system. The annotation imagery may include vector and/or bit-mapped data. The annotation metadata may include metadata pertaining to the annotation imagery itself and/or metadata pertaining to registration of the annotation imagery with respect to the selected document.

The foregoing discussions pertaining to displaying a document over which annotations can be made and captured rely, at least in part, on capabilities of various user devices. Such user devices may include one or more surfaces (e.g., a first display screen, a second display screen, etc.) on which one or more user controls (e.g., to manage interaction windows, to create annotations, etc.) can be presented. Various example embodiments of user controls for creating annotations are shown and described as pertains to FIG. 3A and FIG. 3B.

Figure 3A:
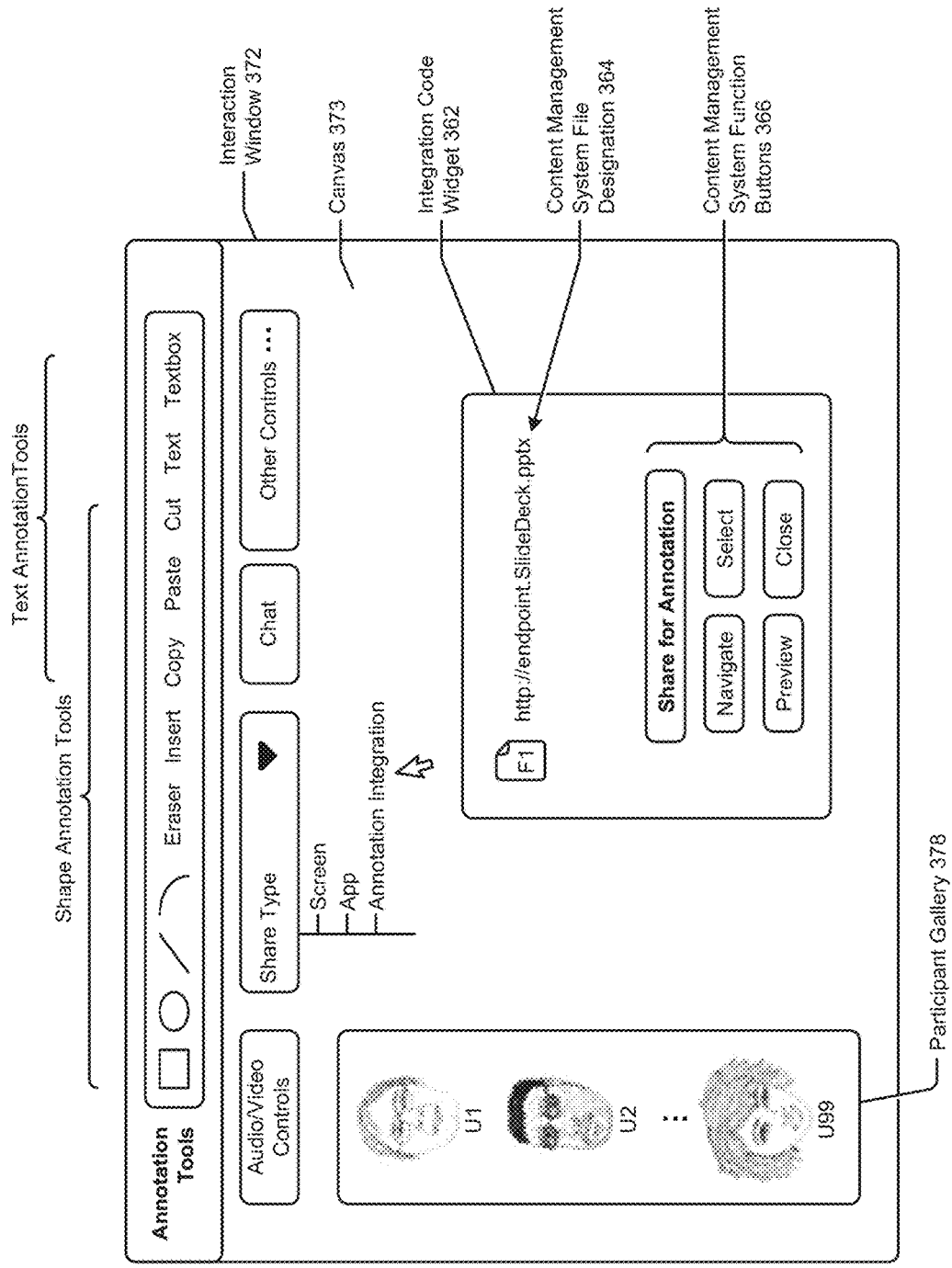
FIG. 3A depicts an example web conferencing facility display surface that implements controls for composing an annotation over a shared document, according to an embodiment.

FIG. 3A depicts an example web conferencing facility display surface 300 that implements controls for composing an annotation over a shared document. As an option, one or more variations of web conferencing facility display surface 300 or any aspect thereof may be implemented in the context of the architecture and functionality of the embodiments described herein and/or in any environment.

The figure is being presented to illustrate one possible configuration of a web conferencing facility display surface. Variations of the screen widgets and/or variations of the juxtaposition of the regions are contemplated, some of which variations are discussed hereunder.

As shown, an interaction window 372 includes a canvas 373 on which is displayed a participant gallery 378 that displays avatars of participants in the web conference. The shown canvas 373 has an area for audio/video controls, an area for a chat controls, and an area for other controls. In addition to the foregoing controls, canvas 373 supports pop-up of an integration code widget 362. The integration code widget in turn supports display of a content management system file designation 364, possibly including an icon and a path or filename. The pop-up of the integration code widget has space for one or more content management system function buttons 366. In this example, the content management system action buttons include a "Navigate" function button, a "Select" function button, a "Preview" function button, a "Close" function button, and a "Share for Annotation" button. Activating (e.g., pressing) the "Share for Annotation" function button brings up the "Annotation Tools", any of which can be used to annotate over a displayed document. Strictly as examples, the "Annotation Tools" may include tools for drawing rectilinear shapes, curvilinear shapes, lines, concave shapes, convex shapes, as well as tools for erasing, inserting, copying, pasting, selecting/cutting and/or adding text. In some embodiments, the "Annotation Tools" may include shape annotation tools that are configured for drawing rectilinear shapes, curvilinear shapes, lines, concave shapes, convex shapes, as well as text annotation tools for copying, pasting, selecting/cutting and/or adding text.

Activation of any of the aforementioned content management system action buttons serves to invoke portions of the integration code that in turn displays a whiteboard. One possible implementation of a whiteboard is shown and described as pertains to FIG. 3B.

Figure 3B:
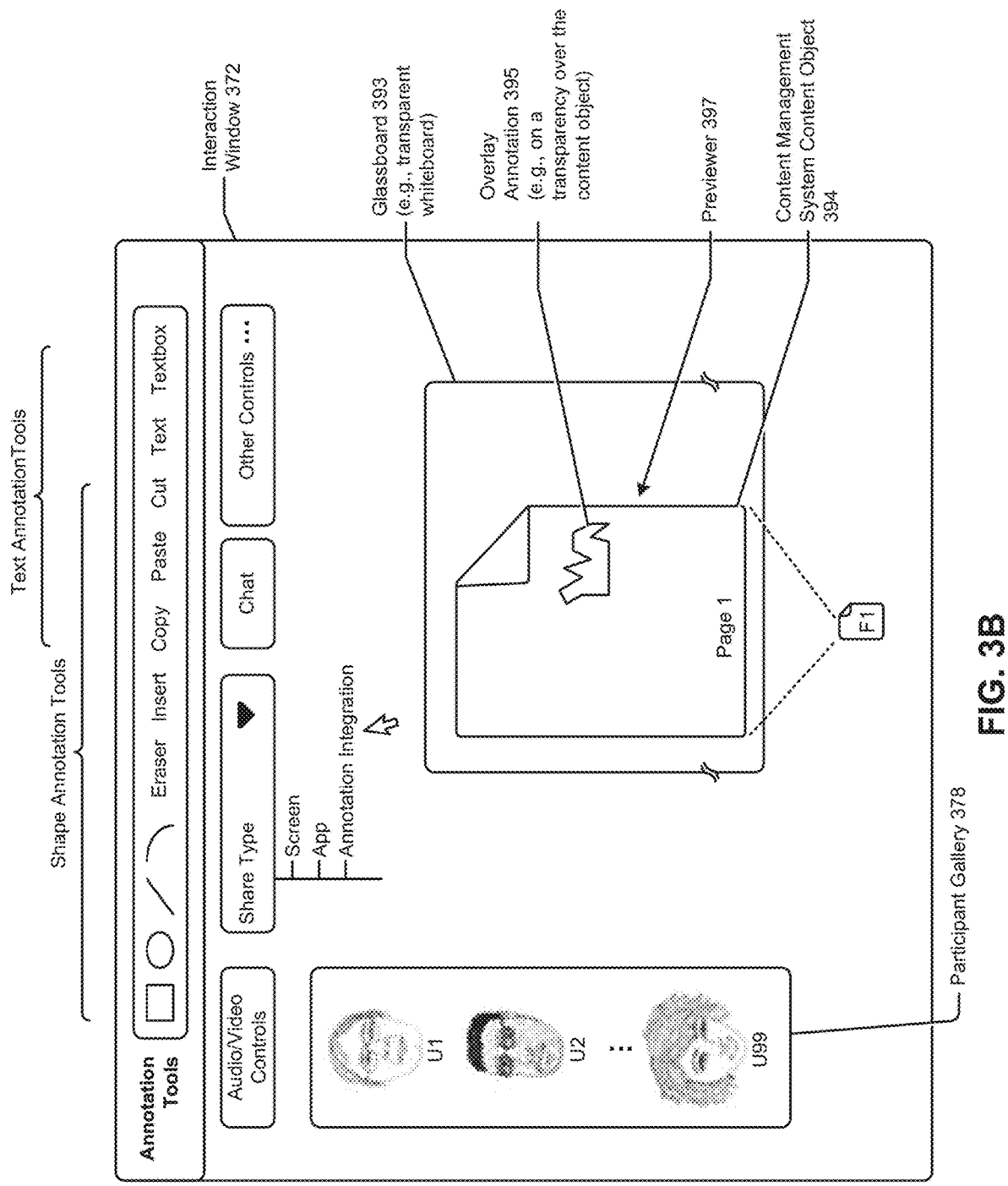
FIG. 3B depicts an example web conferencing facility display surface that implements a whiteboard for composing an annotation over a content object, according to an embodiment.

FIG. 3B depicts an example web conferencing facility display surface that implements a whiteboard as used for composing an annotation over a content object while displaying portions of the content object. The figure is being presented to illustrate one technique for how an example transparent whiteboard (e.g., glassboard 393) can be brought-up on a web conferencing display surface. The shown configuration of interaction window 372 supports display of a content management system content object 394 on a lower level display layer provided by a previewer 397. On top of the lower level display layer is a transparent overlay (e.g., glassboard 393) that is rendered such that a user can add an overlay annotation 395 on top of the transparent overlay. Manipulation of the annotation tools (e.g., shape annotation tools, text annotation tools) or in some cases, merely dragging a finger or a mouse or other pointing device over the glassboard leaves a visible overlay annotation. As used herein, a glassboard is an invisible or transparent layer or semi-transparent layer that is juxtaposed between a lower display layer and a higher layer comprising one or more overlay annotations that are registered with respect to the lower display layer.

Any one or more, or any groups of the visible overlay annotations can be registered based on the particular display characteristics of the displayed portion of the content object. If and when the view portal of the displayed portion of the content object changes, the registered annotations change as well with respect to the viewport change. In some cases, the viewport can be changed by navigating through pages of a page-oriented document. In some cases, the viewport can be changed by zooming in or out or by rotation, etc.

The visible overlay annotation remains registered with the displayed portion of the content object. In some cases, a user might navigate away from an initially displayed and annotated page to a new page, and correspondingly. the extent of the glassboard is expanded to transparently overlay the new page. If and when the user navigates back to the initially displayed and annotated page, the previously added annotations are displayed in the same registration as was present and saved as when the user navigated away from the initially displayed and annotated page. As used herein, the overlay annotation or overlay annotations over any portion or portions of any content object remain registered with its corresponding portion or portions of the content object regardless of how the interaction window 372 is configured. More particularly, overlay annotations generated during operation of the web conferencing facility are stored by the content management system in association with a corresponding content object of the content management system. Once the overlay annotation or overlay annotations are stored in association with the corresponding content object, the content object can be displayed in the content management system at any time (e.g., independent of any state of the web conferencing facility), and the overlay annotation or overlay annotations can be selectively displayed (or not displayed) over the content object.

Activation of any of the aforementioned content management system action buttons of FIG. 3A or activation of any of the annotation facilities of FIG. 3B may invoke facilities of the integration code that in turn invoke system-to-system communications. One possible implementation of a protocol for system-to-system communications between a web conferencing system and a content management system is shown and described as pertains to FIG. 4.

Figure 4:
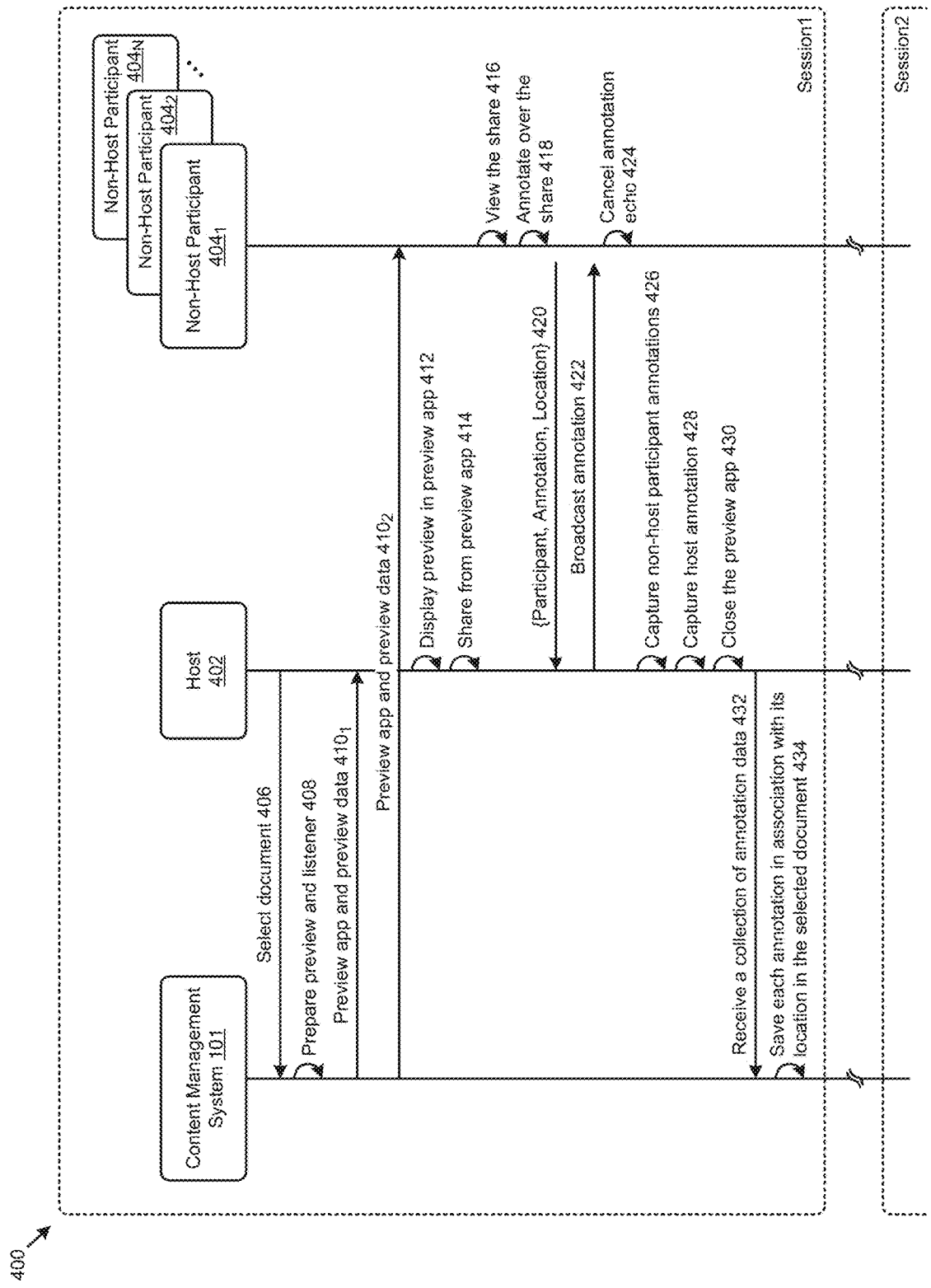
FIG. 4 depicts an example system-to-system integration that implements a protocol for saving a shared annotation in association with a shared document, according to an embodiment.

FIG. 4 depicts an example system-to-system integration 400 that implements a protocol for saving a shared annotation in association with a shared document. As an option, one or more variations of system-to-system integration 400 or any aspect thereof may be implemented in the context of the architecture and functionality of the embodiments described herein and/or in any environment.

The figure is being presented to show one way to keep annotations in synch, even when there are multiple web conference users who are concurrently making annotations over the same page of the same document. Specifically, the figure is being presented to show how a host 402 can serve as a hub and repository for any number of annotations from any number of web conference participants.

As shown, host 402 maintains Internet communications with content management system 101 as well as concurrently maintaining Internet communications with any number of other web conference participants (e.g., non-host participant $404_1$, non-host participant $404_2$, . . . , non-host participant $404_N$). The protocol commences when a host uses integration code to select a document of content management system 101 (message 406). The content management system responds by preparing a previewer (operation 408) for each participant. The previewer that is prepared for and sent to the host (message $410_1$) is configured differently than the previewers that are prepared for and sent to the non-host participants (message 410₂). As such, only one concurrently operating instance of the previewer in any session (e.g., session1) serves as the repository of other participants' annotations. Similarly, only one instance of the previewer in any session (e.g., session1) serves as the broadcaster that distributes a particular annotation from a first participant to all other participants.

When the host executes the previewer that is prepared for and sent to the host, the selected document is displayed (operation 412) on the host's display surface. Once the host decides to share (operation 414), the non-host participants can view the share (operation 416) using their respective copies of the previewer. Moreover, the non-host participants can annotate over the shared view (operation 418) using their respective copies of the previewer.

When any non-host participant makes an annotation, the annotation and various metadata pertaining to the annotation is sent to the host (operation 420). The host then broadcasts the annotation (message 422) to the non-host participants. In some cases, the web conferencing system automatically shares a display of the sharer's computing device (e.g., using communication of display frames). In this case, the annotation might be duplicated. To account for the possibility of such duplication, processing on a participant's computing device can cancel one of the duplicated annotations (operation 424) to avoid visual echo. As shown, the host can process an annotation from non-host participants by capturing participant annotations (operation 426), and further, the host can process an annotation from itself (operation 428).

At some point during the web conference, the previewer is closed (operation 430), possibly using the heretofore mentioned "Close" function button, or possibly by operation of an API call initiated by the web conferencing system. Upon a close indication, any/all of the annotations together with corresponding metadata are delivered (message 432) to the content management system. Each annotation is saved (operation 434) in association with its location in the selected document. In some cases, additional information (e.g., user identities) pertaining to the annotations are saved at the content management system as well. A new session (e.g., session2) can be initiated at any time and the protocol may commence again.

Figure 5:
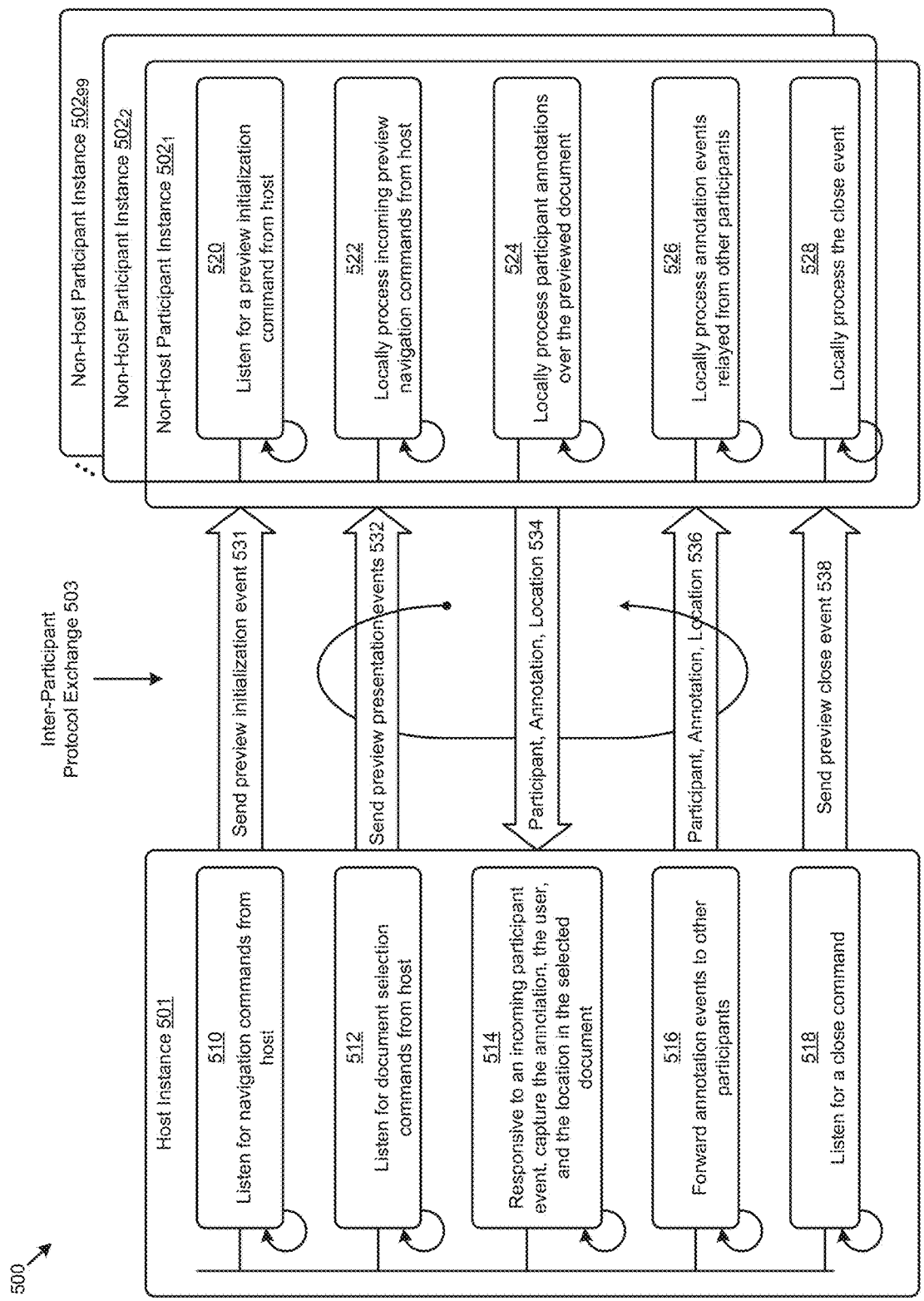
FIG. 5 depicts example interactions between a host instance of integration code and participant instances of integration code, according to an embodiment.

FIG. 5 depicts example interactions 500 between a host instance of integration code and participant instances of integration code. As an option, one or more variations of interactions 500 or any aspect thereof may be implemented in the context of the architecture and functionality of the embodiments described herein and/or in any environment.

The figure is being presented to show how a previewer can be configured differently for a host participant as compared to a non-host participant. More specifically, the figure is being presented to show how a previewer can be configured with a first set of listener and operational code modules for a host participant (e.g., host instance 501) as compared to a second set of listener and operational code modules for non-host participant (e.g., non-host participant instance 502₁, non-host participant instance 502₂, . . . , non-host participant instance 502₉₉). The configuration with the two different sets of listener and operational code modules serve to implement an inter-participant protocol exchange 503.

As regards to the of listener and operational code modules of host instance 501, a listener 510 listens for and processes navigation commands at the host; a listener 512 listens for and processes document selection commands at the host; a listener 514 listens for and processes annotations received from a non-host participant; forwarding code 516 forwards annotations to non-host participants (e.g., non-host participant instance 502₂, . . . , non-host participant instance 502₉₉); and a listener 518 listens for and processes a close command initiated at the host instance.

Each of the foregoing listeners and forwarding code of the host instance are associated with corresponding code modules of the non-host participant instances. More specifically, and as shown, each non-host participant instance includes a listener 520 that listens to and responds to a preview initialization command (e.g., via message 531) from the host instance. Once a preview code is configured on the non-host participant instance, the non-host instance continuously listens (e.g., via listener 522) for any preview presentations events (e.g., via messages 532). Operational code locally processes incoming preview presentations events so as to instruct the previewer to, for example, move to a different page, or to scroll, or to change a view port or resolution, etc.

Upon an annotation event raised from within a non-host participant instance, operational code 524 sends aspects of the annotation (e.g., the participant identifier, the location, the annotation itself, etc.) to the host instance (e.g., via message 534). The host instance receives such messages, and using the information in the messages, listener 514 captures the received annotations (e.g., with respect to the sending user, the location in the document, etc.) before, or concurrently with, initiating the forwarding of the annotations and corresponding metadata to each of the non-host participant instances. In turn, each of the non-host participant instances receive (e.g., at listener 526) the annotation and it metadata. The foregoing portions of the protocol can continue continuously in a loop until such time as the host instance sends a close event (message 538) to the non-host participant instances. The non-host participant instances in turn locally process the close event (e.g., at listener 528). The non-host participant instances remain listening (e.g., via respective instances of listener 520). When a further preview initialization command (e.g., via message 531) is received by non-host participant instance (e.g., at listener 520), the inter-participant protocol exchange 503 begins anew.

Additional Embodiments of the Disclosure

Instruction Code Examples

Figure 6:
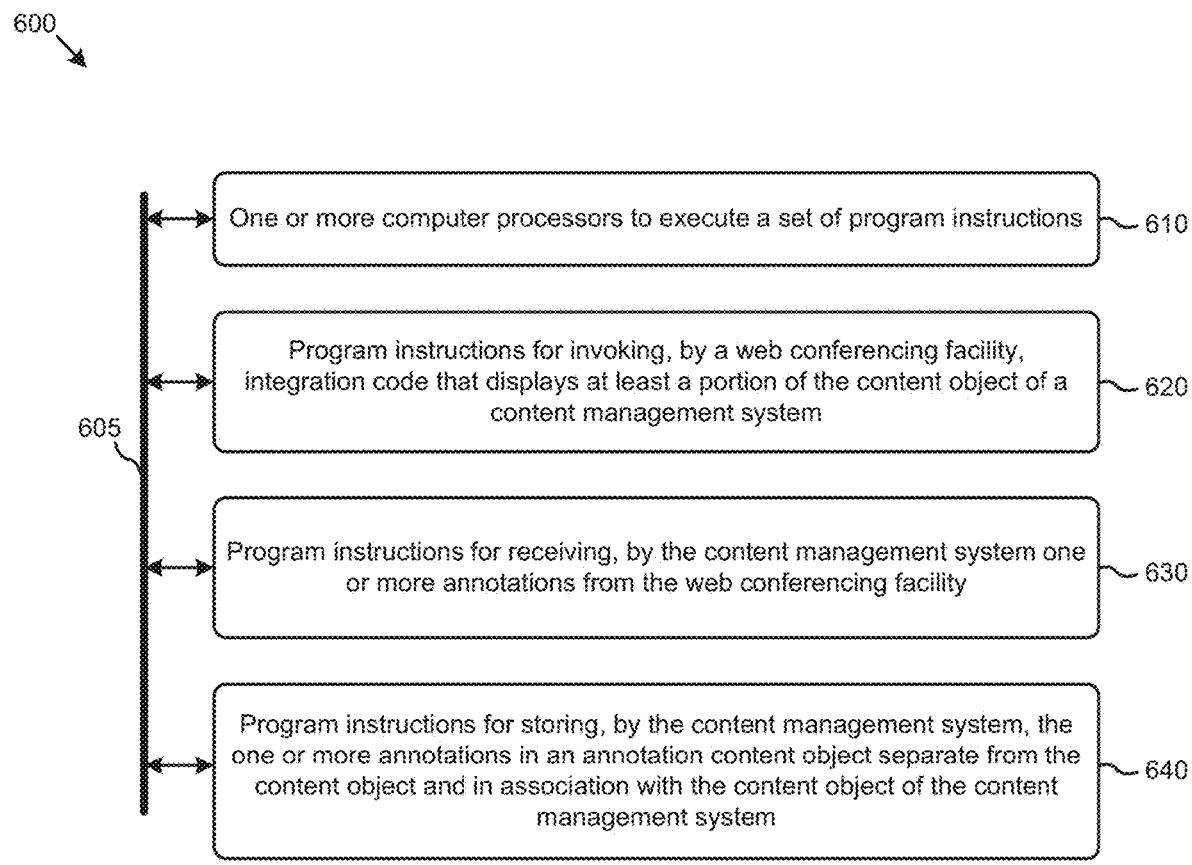
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. This and other embodiments present particular arrangements of elements that, individually or as combined, serve to form improved technological processes that address association of annotations to documents are lost in web conferencing settings. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment. The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with any other operations over communication path 605. The modules of the system can, individually or in combination, perform method operations within system 600. Any operations performed within system 600 may be performed in any order unless as may be specified in the claims. The shown embodiment implements a portion of a computer system, presented as system 600, comprising one or more computer processors to execute a set of program code instructions (module 610) and modules for accessing memory to hold program code instructions to perform: invoking, by a web conferencing facility, integration code that displays at least a portion of the content object of a content management system (module 620); receiving, by the content management system one or more annotations from the web conferencing facility (module 630); and storing, by the content management system, the one or more annotations in an annotation content object separate from the content object and in association with the content object of the content management system (module 640).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

System Architecture Overview

Additional System Architecture Examples

Figure 7A:
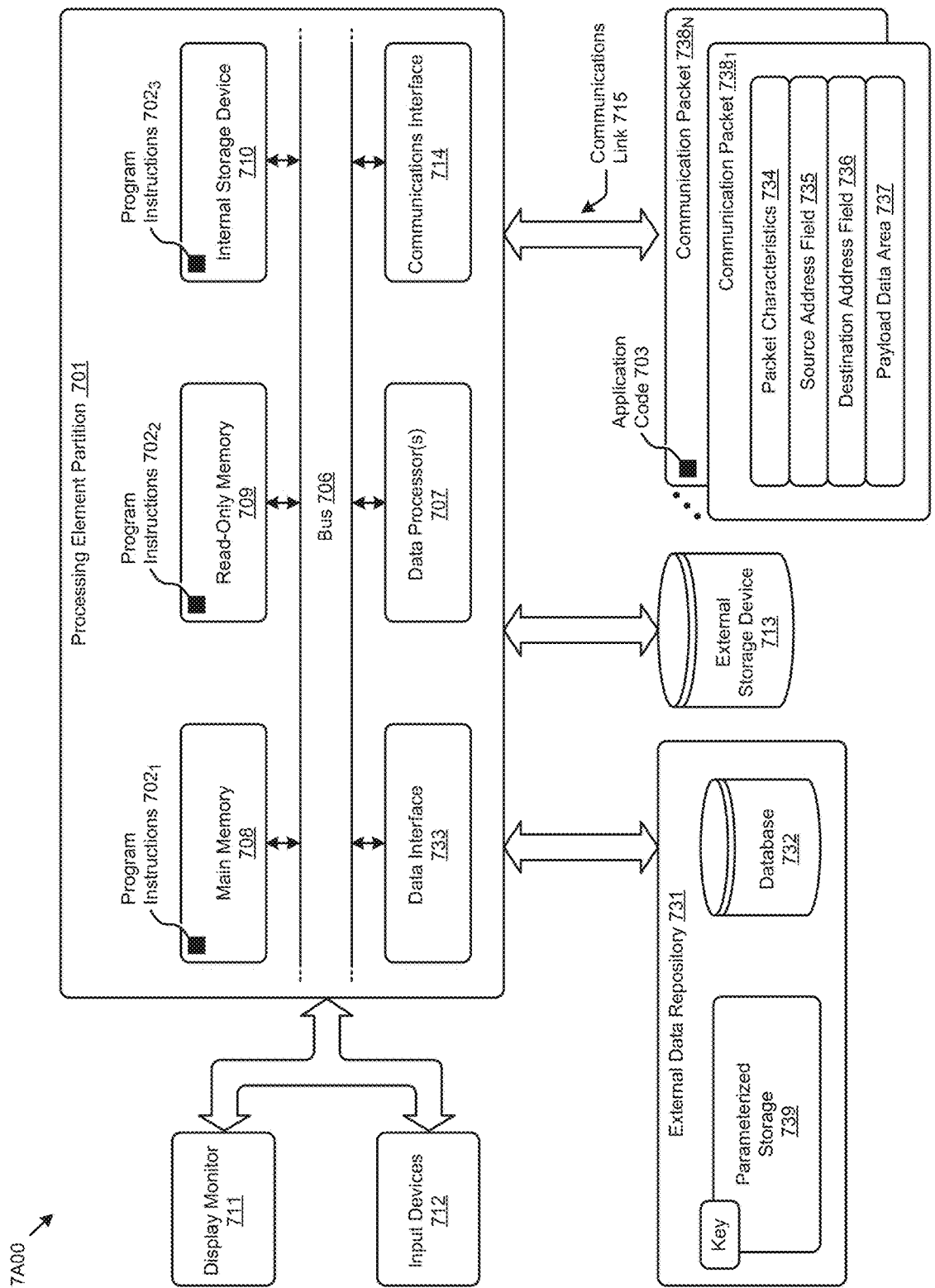
FIG. 7A and FIG. 7B present block diagrams of computer system architectures having components suitable for implementing embodiments of the present disclosure and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. Computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program instructions contained in a memory. Such instructions (e.g., program instructions $702_1$, program instructions $702_2$, program instructions $702_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communication packet $738_1$, communication packet $738_N$) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of a computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program instructions may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to saving a shared annotation in association with a shared document. A module may include one or more state machines and/or combinational logic used to implement or facilitate the operational and/or performance characteristics pertaining to saving a shared annotation in association with a shared document.

Various implementations of database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of saving a shared annotation in association with a shared document). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to saving a shared annotation in association with a shared document, and/or for improving the way data is manipulated when performing computerized operations pertaining to saving shared annotations with or in association with a shared document over which the annotations were made.

Figure 7B:
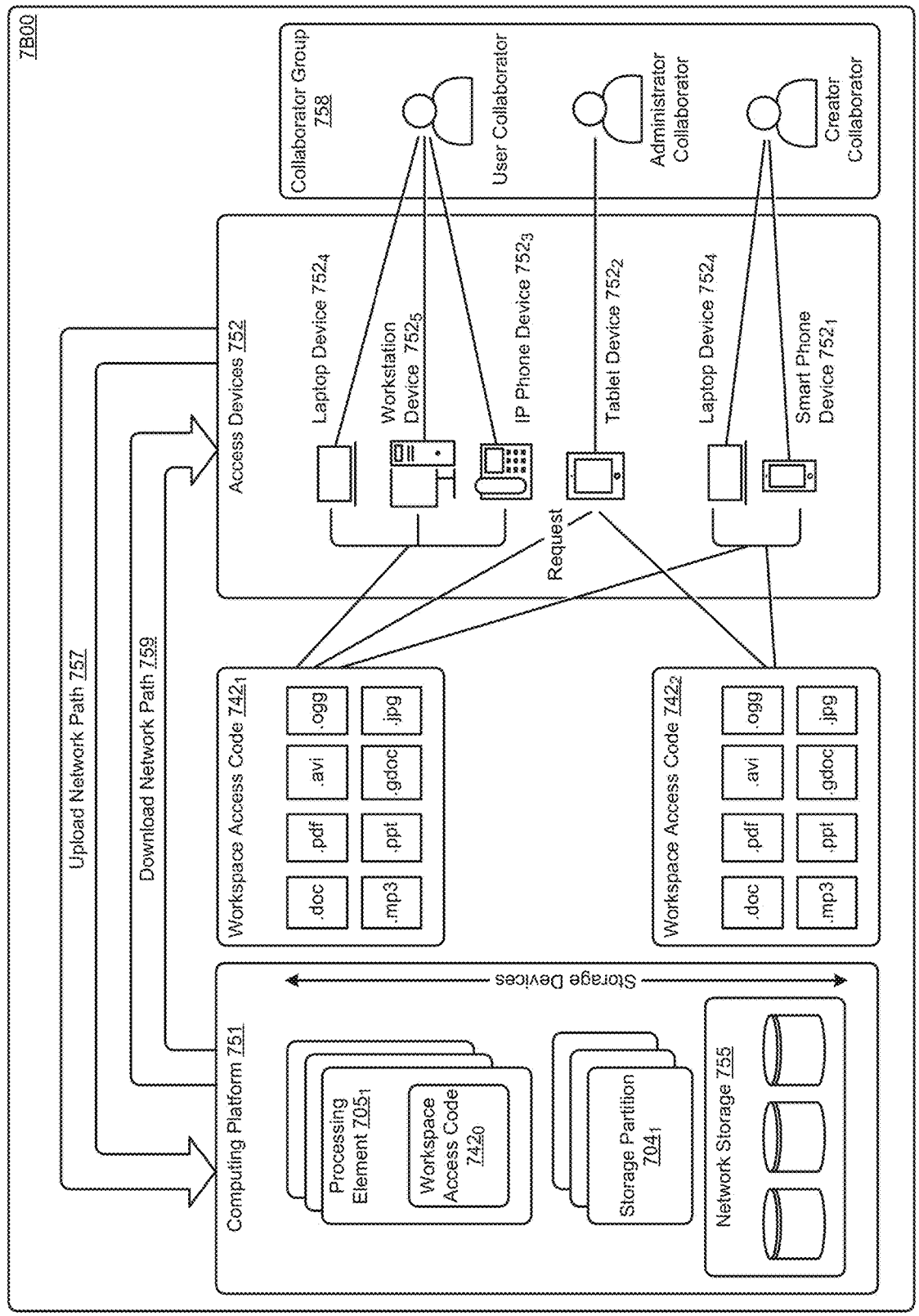

FIG. 7B depicts a block diagram of an instance of a cloud-based environment 7B00. Such a cloud-based environment supports access to workspaces through the execution of workspace access code (e.g., workspace access code $742_0$, workspace access code $742_1$, and workspace access code $742_2$). Workspace access code can be executed on any of access devices 752 (e.g., laptop device $752_4$, workstation device $752_5$, IP phone device $752_3$, tablet device $752_2$, smart phone device $752_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element $705_1$). The workspace access code can interface with storage devices such as networked storage 755. Storage of workspaces and/or any constituent files or objects, and/or any other code or scripts or data can be stored in any one or more storage partitions (e.g., storage partition $704_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for associating an overlay annotation with a content object of a content management system via a web conferencing system, the method comprising:
sending to a web conferencing system at least a subset of a respective content object from a content management system, wherein the web conferencing system invokes integration code that displays at least a portion of the subset of the respective content object received from the content management system;

receiving at the content management system one or more overlay annotations associated with the respective content object from the web conferencing system; and storing, by the content management system, the one or more overlay annotations, wherein the one or more overlay annotations are stored separately from the respective content object and are accessible via the respective content object.

2. The method of claim 1, further comprising saving the one or more overlay annotations in association with a page of the respective content object of the content management system.

3. The method of claim 1, further comprising saving the one or more overlay annotations in association with a sheet of the respective content object of the content management system.

4. The method of claim 1, wherein the one or more overlay annotations are displayed in a previewer of the integration code.

5. The method of claim 1, further comprising providing, to the web conferencing system, first integration code pertaining to a first type of the respective content object of the content management system and providing, to the web conferencing system, second integration code pertaining to a second type of the respective content object of the content management system.

6. The method of claim 1, wherein the integration code is configured to broadcast at least a portion of the one or more overlay annotations to multiple participants of the web conferencing system.

7. The method of claim 6, wherein the integration code is configured to cancel visual echo that occurs when broadcasting to the multiple participants.

8. The method of claim 1, wherein the integration code is configured to display a transparent overlay over the respective content object.

9. The method of claim 1, wherein the integration code that is configured to display the one or more overlay annotations displays a glassboard between the respective content object and the one or more overlay annotations.

10. The method of claim 9, wherein the one or more overlay annotations comprise one or more shapes made over the glassboard.

11. A non-transitory computer readable medium having stored thereon a sequence of instructions which, when stored in memory and executed by one or more processors causes the one or more processors to perform a set of acts for associating an overlay annotation with a content object of a content management system via a web conferencing system, the set of acts comprising:

sending to a web conferencing system at least a subset of a respective content object from a content management system, wherein the web conferencing system invokes integration code that displays at least a portion of the subset of the respective content object received from the content management system;

receiving at the content management system one or more overlay annotations associated with the respective content object from the web conferencing system; and storing, by the content management system, the one or more overlay annotations, wherein the one or more overlay annotations are stored separately from the respective content object and are accessible via the respective content object.

12. The non-transitory computer readable medium of claim 11, further comprising instructions which, when stored in memory and executed by the one or more processors causes the one or more processors to perform acts of saving the one or more overlay annotations in association with a page of the respective content object of the content management system.

13. The non-transitory computer readable medium of claim 11, further comprising instructions which, when stored in memory and executed by the one or more processors causes the one or more processors to perform acts of saving the one or more overlay annotations in association with a sheet of the respective content object of the content management system.

14. The non-transitory computer readable medium of claim 11, wherein the one or more overlay annotations are displayed in a previewer of the integration code.

15. The non-transitory computer readable medium of claim 11, further comprising instructions which, when stored in memory and executed by the one or more processors causes the one or more processors to perform acts of providing, to the web conferencing system, first integration code pertaining to a first type of the respective content object of the content management system and providing, to the web conferencing system, second integration code pertaining to a second type of the respective content object of the content management system.

16. The non-transitory computer readable medium of claim 11, wherein the integration code is configured to broadcast at least a portion of the one or more overlay annotations to multiple participants of the web conferencing system.

17. The non-transitory computer readable medium of claim 16, wherein the integration code is configured to cancel visual echo that occurs when broadcasting to the multiple participants.

18. The non-transitory computer readable medium of claim 11, wherein the integration code is configured to display a transparent overlay over the respective content object.

19. A system for associating an overlay annotation with a content object of a content management system via a web conferencing system, the system comprising:

a storage medium having stored thereon a sequence of instructions; and one or more processors that execute the sequence of instructions to cause the one or more processors to perform a set of acts, the set of acts comprising, sending to a web conferencing system at least a subset of a respective content object from a content management system, wherein the web conferencing system invokes integration code that displays at least a portion of the subset of the respective content object received from the content management system;

receiving at the content management system one or more overlay annotations associated with the respective content object from the web conferencing system; and storing, by the content management system, the one or more overlay annotations, wherein one or more overlay annotations are stored separately from the respective content object and are accessible via the respective content object.

20. The system of claim 19, further comprising saving the one or more overlay annotations in association with a page of the respective content object of the content management system.

* * * * *